US012314292B1

(12) United States Patent
Chen et al.

(10) Patent No.: US 12,314,292 B1
(45) Date of Patent: May 27, 2025

(54) METHOD AND SYSTEM FOR CREATING AN INDEX

(71) Applicant: International Business Machines Corporation, Armonk, NY (US)

(72) Inventors: Ye Chen, Beijing (CN); Dong Rui Li, Beijing (CN); Xue Lan Zhang, Beijing (CN); Zai Ming Lao, Beijing (CN); Xue Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/508,524

(22) Filed: Nov. 14, 2023

(51) Int. Cl.
*G06F 16/31* (2019.01)
*G06F 16/35* (2025.01)
*G06F 40/284* (2020.01)

(52) U.S. Cl.
CPC ............ *G06F 16/319* (2019.01); *G06F 16/35* (2019.01); *G06F 40/284* (2020.01)

(58) Field of Classification Search
CPC ....... G06F 16/319; G06F 40/284; F06F 16/35
See application file for complete search history.

(56) References Cited

U.S. PATENT DOCUMENTS

| | | | | |
|---|---|---|---|---|
| 10,810,236 | B1 * | 10/2020 | Zhao | G06F 16/334 |
| 2011/0040762 | A1 * | 2/2011 | Flatland | G06F 16/319 |
| | | | | 707/E17.089 |
| 2014/0059033 | A1 * | 2/2014 | Shaw | G06F 40/45 |
| | | | | 707/708 |
| 2015/0199402 | A1 * | 7/2015 | Agrawal | G06F 16/2228 |
| | | | | 707/723 |
| 2016/0004736 | A1 * | 1/2016 | Tsuchida | G06F 16/2228 |
| | | | | 707/742 |
| 2018/0173791 | A1 | 6/2018 | Zhang et al. | |
| 2019/0325001 | A1 * | 10/2019 | Ramirez Loaiza | G06F 16/9538 |
| 2020/0349205 | A1 * | 11/2020 | Busch | G06F 16/24568 |
| 2022/0083581 | A1 | 3/2022 | Sogawa et al. | |

FOREIGN PATENT DOCUMENTS

| | | |
|---|---|---|
| CN | 108228648 B | 3/2022 |
| KR | 102449572 B1 | 9/2022 |
| WO | 2022151896 A1 | 7/2022 |

OTHER PUBLICATIONS

Disclosed Anonymously, "Smart Document Display", ip.com, Jan. 5, 2022, pp. 1-6, United States.

* cited by examiner

*Primary Examiner* — Dangelino N Gortayo
(74) *Attorney, Agent, or Firm* — Kristofer Haggerty

(57) ABSTRACT

One embodiment of the invention provides a method for creating an inverted index. The method comprises receiving documents to be indexed, classifying the documents to determine document types of the documents, and analyzing the documents to identify crucial portions of the documents. The method further comprises generating, based on the analyzing, inverted indexes corresponding to indexing words contained in the documents. Each inverted index corresponding to each indexing word includes a document type tier identifying at least one document type of at least one document containing the indexing word, and the inverted index further includes a crucial list identifying each document which contains the indexing word in a crucial portion of the document if the indexing word occurs in the crucial portions of the documents. The method further comprises selectively caching each inverted index based on whether the inverted index includes a crucial list.

17 Claims, 11 Drawing Sheets

- Document Type:  W-9
- Word:  Name, income, tax, return
- Key:  Name, Business name
- Value:  John Doe, John Doe Insurance Corporation
- Key-value pairs:  Name: John Doe, Business name: John Doe Insurance Corporation, Form: W-9, etc.
- Crucial information:

Name: John Doe, Business name: John Doe Insurance Corporation, Form: W-9, etc.

- Non-crucial information:

Instructions, latest information, leave this line blank, disregarded, different, above, etc.

360

Request for Taxpayer Identification Number and Certification

W-9

Form
(Rev. October 2018)
Department of the Treasury
Internal Revenue Service

▶ Go to *www.irs.gov/FormW9* for instructions and the latest information.

1 Name (as shown on your income tax return). Name is required on this line; do not leave this line blank.

John Doe

2 Business name/disregarded entity name, if different from above

John Doe Insurance Corporation

FIG. 4

Part I  Taxpayer Identification Number (TIN)  ⟵ 360

Enter your TIN in the appropriate box. The TIN provided must match the name given on line 1 to avoid backup withholding. For individuals, this is generally your social security number (SSN). However, for a resident alien, sole proprietor, or disregarded entity, see the instructions for Part I, later. For other entities, it is your employer identification number (EIN). If you do not have a number, see *How to get a TIN*, later.

Note: If the account is in more than one name, see the instructions for line 1. Also see *What Name and Number To Give the Requester* for guidelines on whose number to enter.

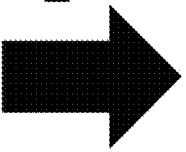

Keywords

```
[{
  "KeyWords": "Taxpayer Identification Number",
  "KeyWords_Position": [103,104,105],
  "PageNumber": 1
},{
  "KeyWords": "social security number",
  "KeyWords_Position": [134, 135, 136],
  "PageNumber": 1
}]
```

FIG. 7

METHOD AND SYSTEM FOR CREATING AN INDEX

BACKGROUND

Embodiments of the invention generally relate to creating indexes, and more specifically, creating an inverted index that improves full-text search efficiency and accuracy.

Full-text search (i.e., content search) generally refers to querying/searching for text inside extensive content data that is stored electronically, and returning results that contain some or all of the text. An inverted index is used to store a mapping of a token to a storage location of a document or a set of documents under a full-text index.

SUMMARY

One embodiment of the invention provides a method for creating an inverted index. The method comprises receiving one or more documents to be indexed, classifying the one or more documents to determine one or more document types of the one or more documents, and analyzing the one or more documents to identify one or more crucial portions of the one or more documents. The method further comprises generating, based on the analyzing, one or more inverted indexes corresponding to one or more indexing words contained in the one or more documents. Each inverted index corresponding to each indexing word includes a document type tier identifying at least one document type of at least one document containing the respective indexing word, and the inverted index further includes a crucial list identifying each document which contains the respective indexing word in a crucial portion of the respective document if the respective indexing word occurs in the one or more crucial portions of the one or more documents. The method further comprises selectively caching each inverted index based on whether the inverted index includes the crucial list. Other embodiments include a system for creating an inverted index, and a computer program product for creating an inverted index.

BRIEF DESCRIPTION OF THE DRAWINGS

The subject matter which is regarded as embodiments of the invention are particularly pointed out and distinctly claimed in the claims at the conclusion of the specification. The foregoing and other objects, features, and advantages of embodiments of the invention are apparent from the following detailed description taken in conjunction with the accompanying drawings in which:

FIG. 4 illustrates crucial information and non-crucial information extracted from an example document, in accordance with an embodiment of the invention;

FIG. 7 illustrates a portion of an example document and keywords extracted from the portion, in accordance with an embodiment of the invention;

Figure 1:
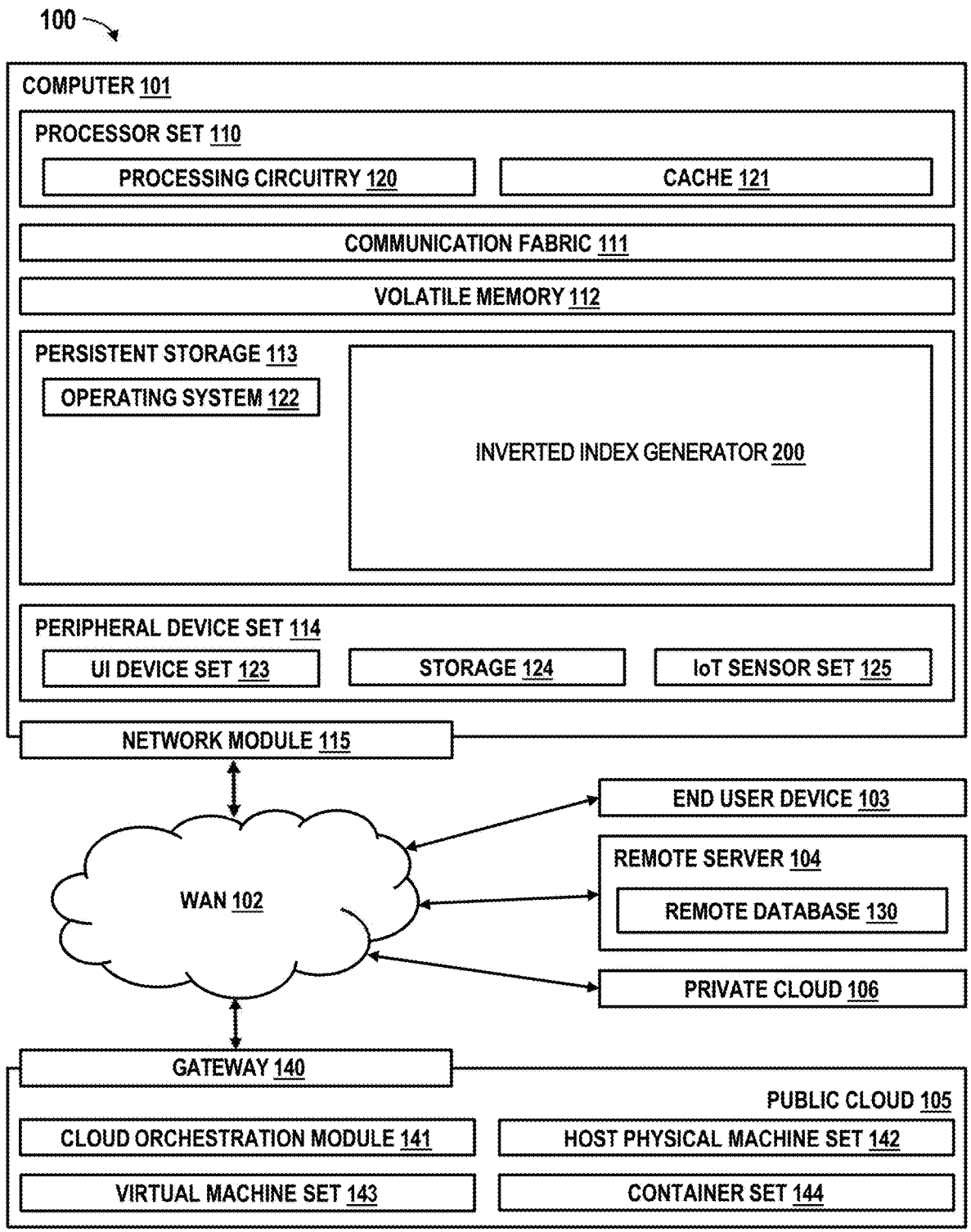
FIG. 1 depicts a computing environment according to an embodiment of the present invention.

The detailed description explains the preferred embodiments of the invention, together with advantages and features, by way of example with reference to the drawings.

DETAILED DESCRIPTION

Embodiments of the invention generally relate to creating indexes, and more specifically, creating an inverted index that improves full-text search efficiency and accuracy. One embodiment of the invention provides a method comprising receiving one or more documents to be indexed, classifying the one or more documents to determine one or more document types of the one or more documents, and analyzing the one or more documents to identify one or more crucial portions of the one or more documents. The method further comprises generating, based on the analyzing, one or more inverted indexes corresponding to one or more indexing words contained in the one or more documents. Each inverted index corresponding to each indexing word includes a document type tier identifying at least one document type of at least one document containing the respective indexing word, and the inverted index further includes a crucial list identifying each document which contains the respective indexing word in a crucial portion of the respective document if the respective indexing word occurs in the one or more crucial portions of the one or more documents. The method further comprises selectively caching each inverted index based on whether the inverted index includes the crucial list.

Another embodiment of the invention provides a system for creating an inverted index. The system comprises at least one processor and a processor-readable memory device storing instructions that when executed by the at least one processor causes the at least one processor to perform operations. The operations include receiving one or more documents to be indexed, classifying the one or more documents to determine one or more document types of the one or more documents, and analyzing the one or more documents to identify one or more crucial portions of the one or more documents. The operations further include generating, based on the analyzing, one or more inverted indexes corresponding to one or more indexing words contained in the one or more documents. Each inverted index corresponding to each indexing word includes a document type tier identifying at least one document type of at least one document containing the respective indexing word, and the inverted index further includes a crucial list identifying each document which contains the respective indexing word in a crucial portion of the respective document if the respective indexing word occurs in the one or more crucial portions of the one or more documents. The operations further include selectively caching each inverted index based on whether the inverted index includes the crucial list.

One embodiment of the invention provides a computer program product for creating an inverted index. The computer program product comprises a computer readable storage medium having program instructions embodied therewith. The program instructions are executable by a processor to cause the processor to receive one or more documents to be indexed, classify the one or more documents to determine one or more document types of the one or more documents, and analyze the one or more documents to identify one or more crucial portions of the one or more documents. The program instructions are executable by the processor to further cause the processor to generate, based on the analyzing, one or more inverted indexes corresponding to one or more indexing words contained in the one or more documents. Each inverted index corresponding to each indexing word includes a document type tier identifying at least one document type of at least one document containing the respective indexing word, and the inverted index further includes a crucial list identifying each document which contains the respective indexing word in a crucial portion of the respective document if the respective indexing word occurs in the one or more crucial portions of the one or more documents. The program instructions are executable by the processor to further cause the processor to selectively cache each inverted index based on whether the inverted index includes the crucial list.

In some embodiments, for each inverted index, the inverted index is loaded into cache priorly only if the inverted index includes the crucial list.

In some embodiments, for each inverted index loaded into the cache priorly, a length of a crucial list included in the inverted index is determined, and a part of a non-crucial list included in the inverted index is added to cache if the length of the crucial list is not greater than a pre-determined threshold.

In some embodiments, the one or more crucial portions of the one or more documents include at least one of a key-value pair, a table, or a keyword.

In some embodiments, for each document type of a document type tier included in each inverted index, the inverted index further includes at least one of a: crucial list identifying each document of the respective document type which contains the respective indexing word in a crucial portion of the respective document, and a non-crucial list identifying each document of the document type which contains the respective indexing word in a non-crucial portion of the respective document.

In some embodiments, for each document, a document type of the respective document and one or more crucial portions of the respective document is maintained in a database.

In some embodiments, for each indexing word, a corresponding posting list identifying each document containing the respective indexing word and a frequency of the respective indexing word across the one or more documents is created. Each inverted index corresponding to each indexing word is generated based on each posting list corresponding to the indexing word.

A crucial portion of a document is a portion (i.e., part) of the document that contains crucial information (i.e., important or critical information) (e.g., personal identifiable information such as name, identification number, etc.). A non-crucial portion of a document is a portion (i.e., part) of the document that contains non-crucial information (i.e., non-important or non-critical information) (e.g., instructions, etc.). Examples of crucial portions of a document include, but are not limited to, key-value pairs, tables, keywords, etc.

A document list is a list identifying one or more documents which contain a particular indexing word. A crucial list is a document list identifying one or more documents of a particular document type which contain a particular indexing word in one or more crucial portions of the one or more documents. A non-crucial list is a document list identifying one or more documents of a particular document type which contain a particular indexing word in one or more non-crucial portions of the one or more documents.

A conventional full-text search engine processes each word in a document equally, thereby reducing searching efficiency and accuracy. Words that appear in crucial portions of a document, however, are typically of more interest to users. For example, when performing a full-text search on a tax form, users are more likely to search for text within content on a first page of the tax form.

A conventional full-text indexer builds an inverted index by extracting each word from each page and building an index equally for each word extracted. This, however, results in several drawbacks such as, but not limited to the following: resulting indexes corresponding to different important levels are stored in a staggered mode; the indexes are not small enough to store in main memory; more time is required to read the indexes from disk; and search results are not sorted by concern extent. For example, if a user searches for the text "New York", a document that contains the text "New York" in an address field is more likely to be of interest to the user than a document that contains the text "New York" in an example or help section.

One or more embodiments provide a framework for building inverted indexes for crucial portions and non-crucial portions of documents based on document types. In one embodiment, the framework is configured to: (1) acquire/receive a document to be indexed, (2) classify the document to determine a document type of the document, (3) analyze the document to identify one or more crucial portions of the document, (4) build one or more inverted indexes based on the one or more crucial portions identified, and (5) selectively cache each inverted index built. The framework improves full-text search efficiency and accuracy on documents such as, but not limited to, business documents, tax forms, etc.

In one embodiment, building the inverted indexes comprises, for each indexing word, adding a tier identifying one or more document types ("document type tier") in between the indexing word and a document list corresponding to the indexing word. Building the inverted indexes further comprises, for each document type of the document type tier, dividing the document list into a corresponding crucial list and a corresponding non-crucial list. Therefore, the document list is divided based on document types and crucial portions identified.

In one embodiment, selectively caching each inverted index built comprises loading inverted indexes that have crucial lists into cache priorly.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts a computing environment 100 according to an embodiment of the present invention. Computing environment 100 contains an example of an environment for the execution of at least some of the computer code involved in performing the inventive methods, such as an inverted index generator code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
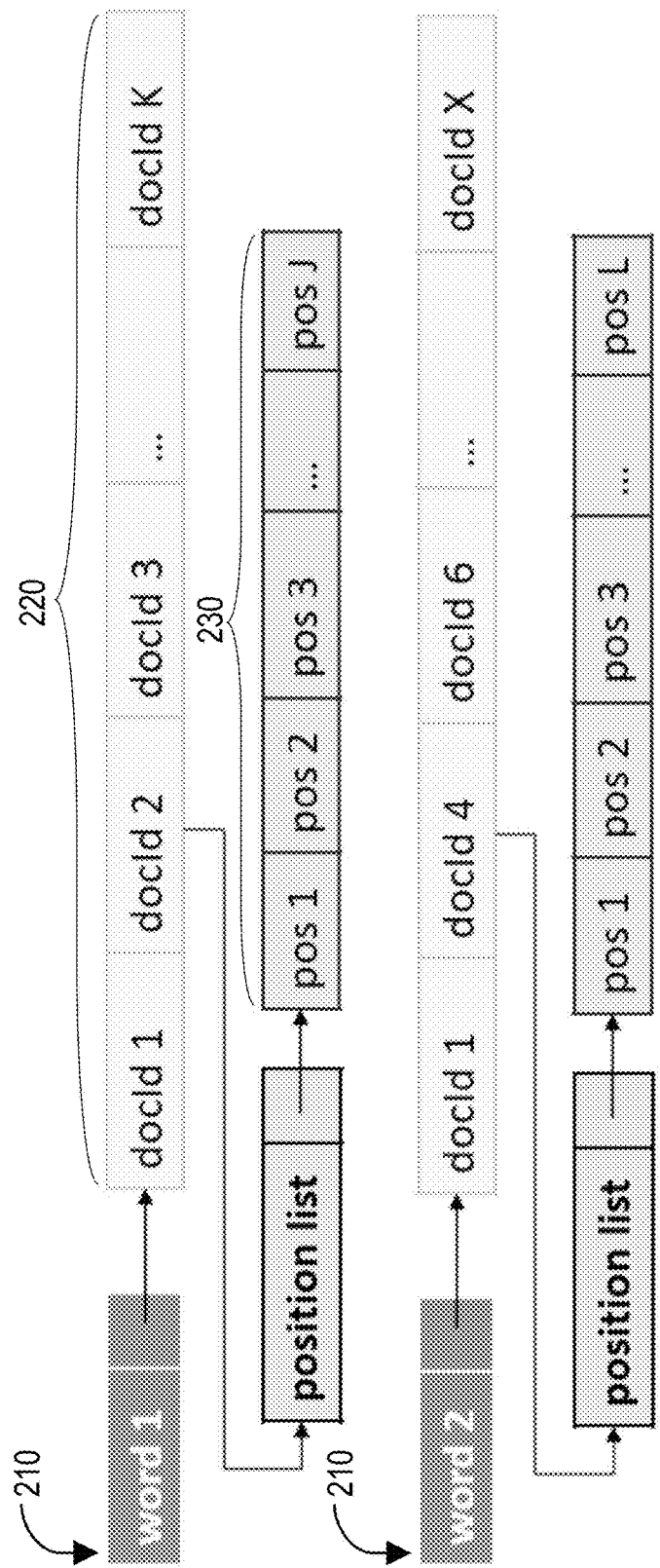
FIG. 2 illustrates an example of conventional inverted indexes for full-text search.

FIG. 2 illustrates an example of conventional inverted indexes 210 for full-text search. Conventionally, a full-text indexer builds inverted indexes 210 by extracting each word from each page and building an inverted index 210 equally for each word extracted. For example, as shown in FIG. 2, a first word extracted ("word 1") has a corresponding inverted index 210 that includes a corresponding document list 220 identifying each document containing the first word (e.g., docId 1, docId 2, docId 3, . . . , docId K), and each document identified in the corresponding document list has a corresponding position list 230 identifying each position in the document where the first word occurs (e.g., pos 1, pos 2, pos 3, . . . , pos J).

As another example, as shown in FIG. 2, a second word extracted ("word 2") has a corresponding inverted index 210 that includes a corresponding document list 220 identifying each document containing the second word (e.g., docId 1, docId 4, docId 6, . . . , docId X), and each document identified in the corresponding document list has a corresponding position list 230 identifying each position in the document where the second word occurs (e.g., pos 1, pos 2, pos 3, . . . , pos L).

Figure 3:
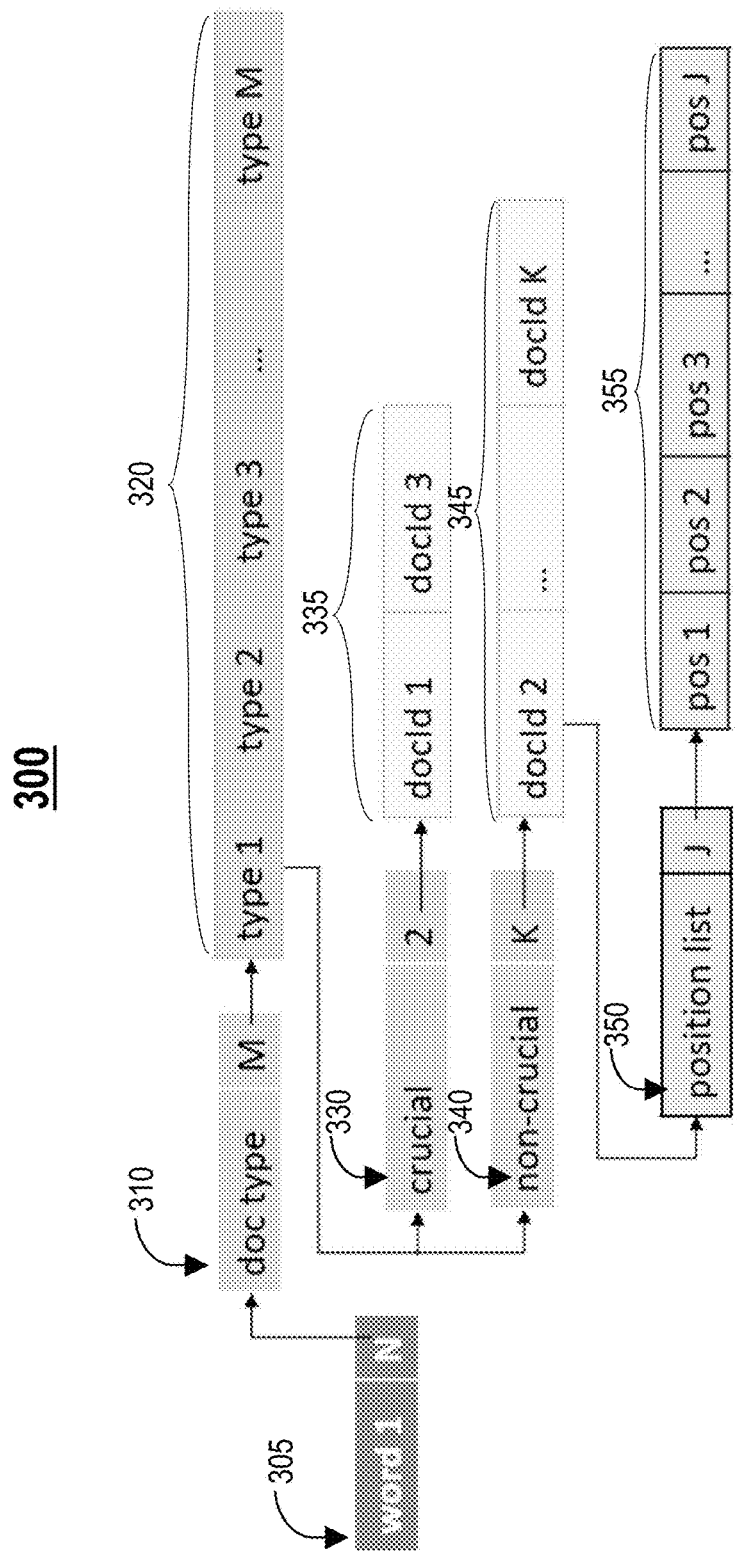
FIG. 3 illustrates an example of an inverted index for full-text search, in accordance with an embodiment of the invention.

FIG. 3 illustrates an example of an inverted index 300 for full-text search, in accordance with an embodiment of the invention. As described in detail later herein, each word extracted has a corresponding inverted index 300. The inverted index 300 includes a corresponding indexing word tier 305 identifying an extracted word (e.g., "word 1") and the overall frequency of the word (e.g., N) (i.e., the total number of times the word occurs in one or more documents). The indexing word tier 305 references/points to a corresponding document type tier 310.

The document type tier 310 identifies the total number of different document types (e.g., M) containing the word and references/points to a corresponding document type list 320 identifying the different document types (e.g., type 1, type 2, type 3, . . . , and type M).

Each document type of the document type list 320 has a corresponding crucial tier 330 and non-crucial tier 340. The crucial tier 330 identifies the total number of different documents (e.g., 2) containing the word as crucial information and references/points to a corresponding crucial list 335 identifying the different documents (e.g., docId 1, docId 3). The non-crucial tier 340 identifies the total number of different documents (e.g., K) containing the word as non-crucial information and references/points to a corresponding non-crucial list 345 identifying the different documents (e.g., docId 2, . . . , docId K).

Each document identified in each list 335, 345 has a corresponding position tier 350. The position tier 350 identifies the total number of different positions (e.g., J) in the document where the word occurs and references/points to a corresponding position list 355 identifying the different positions (e.g., pos 1, pos 2, pos 3, . . . , pos J).

FIG. 4 illustrates crucial information and non-crucial information extracted from an example document 360, in accordance with an embodiment of the invention. Assuming a document 360 comprises a tax return form, a document type of the document 360 may be "W-9", and words extracted from the document 360 may include "Name", "income", "tax", and "return". Keys of the document 360 may include "Name" and "Business name" with corresponding values "John Doe" and "John Doe Insurance Corporation", respectively, resulting in key-value pairs "Name: John Doe" and "Business name: John Doe Insurance Corporation".

Examples of crucial information contained within the document 360 may include text such as "Name: John Doe", "Business name: John Doe Insurance Corporation", "Form: W-9", etc. Examples of non-crucial information contained within the document 360 may include other text such as "Instructions", "latest information", etc.

Figure 5:
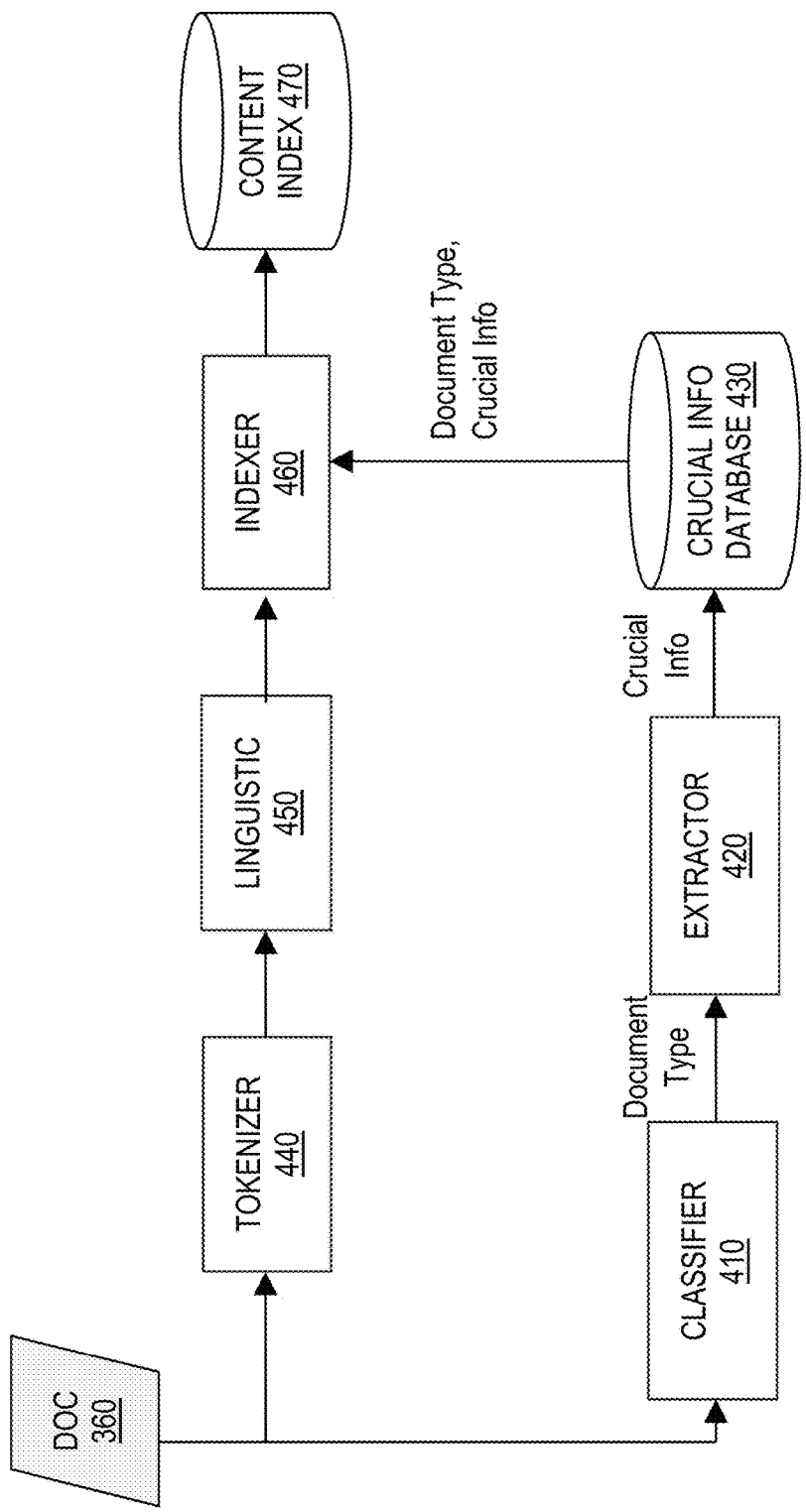
FIG. 5 illustrates example inverted index generator system, in accordance with an embodiment of the invention.

FIG. 5 illustrates example inverted index generator system 400, in accordance with an embodiment of the invention. In one embodiment, the system 400 comprises a classifier unit 410 configured to: (1) receive a document 360, and (2) classify/identify a document type of the document 360. Examples of different document types include, but are not limited to, "W-9" (for documents comprising tax return forms), "Invoice" (for documents comprising invoices), "Bill of Lading" (for documents comprising bills of lading), etc. Examples of different technologies that the classifier unit 410 utilizes include, but are not limited to, image hash comparison, text content/keywords similarity, document fingerprint identification, etc.

In one embodiment, the system 400 comprises an extractor unit 420 configured to: (1) receive a document 360 and a corresponding document type of the document 360 (e.g., from the classifier unit 410), and (2) identify crucial information in the document 360 based on the document type.

In one embodiment, the extractor unit 420 identifies crucial information in a document 360 by extracting key-value pairs from the document 360. The extractor unit 420 may extract key-values pairs from a document 360 using, but not limited to, at least one of the following: regular expressions, rule-based templates, named entity recognition, NLP, machine learning, etc.

In another embodiment, the extractor unit 420 identifies crucial information in a document 360 by extracting keywords from the document 360. The extractor unit 420 may extract keywords from a document 360 using, but not limited to, at least one of the following: NLP, named entity recognition, large language model, etc.

Data in a table is typically crucial information. In another embodiment, the extractor unit 420 identifies crucial information in a document 360 by extracting tables from the document 360.

In one embodiment, the extractor unit 420 optionally identifies crucial information in a document 360 using a pre-defined ontology or knowledge graph.

In one embodiment, the system 400 comprises a crucial information database 430 configured to: (1) receive a document type of a document 360 and crucial information identified in the document 360 (e.g., from the extractor unit 420), and (2) maintain/store the document type and the crucial information.

In one embodiment, the system 400 comprises a tokenizer unit 440 configured to: (1) receive a document 360, and (2) applies tokenization to the document 360 to break text in the document 360 into one or more tokens. In general, a token is an individual word or part representing an object (either physical or virtual) or an abstract concept. For example, if the document 360 comprises the tax return form shown in FIG. 4, example tokens include, but are not limited to, "Name", "John", "blank", etc.

In one embodiment, the system 400 comprises a linguistic unit 450 configured to: (1) receive tokens of a document 360 (e.g., from the tokenizer unit 440), and (2) apply one or more linguistic rules to the tokens to break down the tokens into potential indexing words for the document 360. For example, the linguistic unit 450 may break down token "Name", "John", and "blank" into potential indexing words "name", "john", and "blank", respectively.

In one embodiment, the system 400 comprises an indexer unit 460 configured to receive: (1) potential indexing words for a document 360 (e.g., from the linguistic unit 450), (2) obtain a document type of the document 360 and crucial information identified in the document 360 from the crucial information database 430, and (3) create, based on the potential indexing words, the document type, and the crucial information, at least one posting list 500 (FIG. 8) corresponding to at least one of the potential indexing words. A posting list 500 corresponding to an indexing word is used to build an inverted index 300 corresponding to the indexing word.

In one embodiment, the system 400 comprises a content index unit 470 configured to receive: (1) receive one or more posting lists 500 corresponding to one or more indexing words (e.g., from the indexer unit 460), and (2) for each posting list 500 corresponding to each indexing word, determine whether to cache or store on disk an inverted index 300 corresponding to the indexing word based on whether a crucial list is included in the posting list 500. If a posting list 500 corresponding to an indexing word includes a crucial list, an inverted index 300 corresponding to the indexing word is built based on the posting list 500, and the inverted index 300 is loaded into cache. If a posting list 500 corresponding to an indexing word does not include a crucial list, an inverted index 300 corresponding to the indexing word is built based on the posting list 500, and the inverted index 300 is stored on disk instead. Therefore, the content index unit 470 selectively caches each inverted index 300 corresponding to each indexing word.

For example, if the document 360 comprises the tax return form shown in FIG. 4, inverted indexes 300 corresponding to indexing words such as "name", "john", "business name", "insurance", and "corporation" are cached as posting lists 500 corresponding to these indexing words include crucial lists (i.e., these indexing words are identified as crucial information). By comparison, inverted indexes 300 corresponding to indexing words such as "box" and "blank" are stored on disk instead as posting lists 500 corresponding to these indexing words do not include crucial lists (i.e., these indexing words are identified as non-crucial information only).

In one embodiment, the content index unit 470 optionally uses a pre-determined threshold to determine whether to cache part of a non-crucial list. Specifically, in an initialization phase, the content index unit 470 determines which indexing words to load to cache as follows: For each posting list 500 corresponding to each indexing word, and for each document type of a document type list included in the posting list 500, determine whether a crucial list for the document type is present. If a crucial list is present, add the indexing word and the crucial list to cache, and determine a length of the crucial list. If the length of the crucial list is not greater than a pre-determined threshold, add part of a non-crucial list for the same document type to cache.

Figure 6:
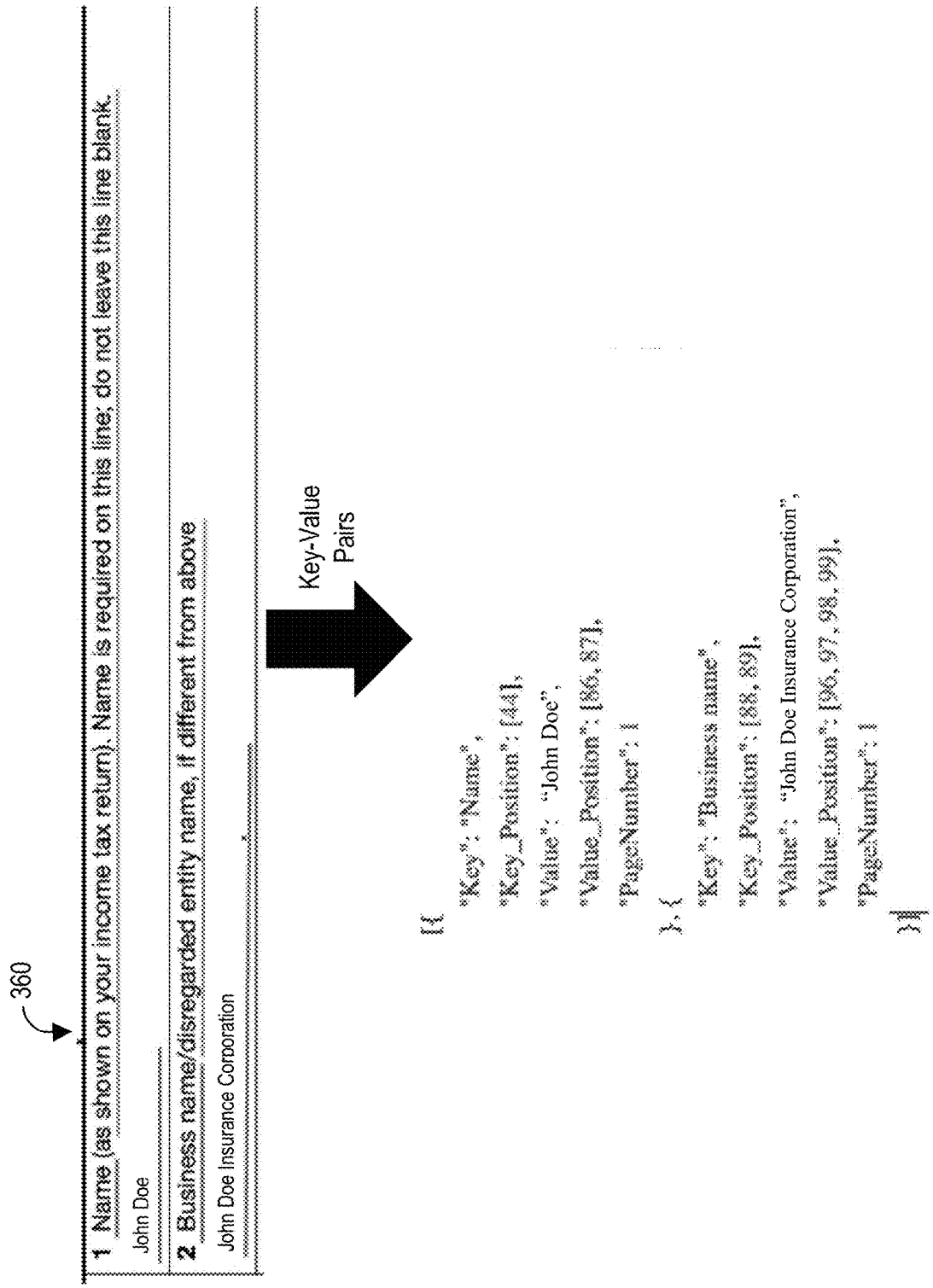
FIG. 6 illustrates a portion of an example document and key-value pairs extracted from the portion, in accordance with an embodiment of the invention.

FIG. 6 illustrates a portion of an example document 360 and key-value pairs extracted from the portion, in accordance with an embodiment of the invention. If the document 360 comprises a tax return form as shown in FIG. 6, a user is most likely to search for text such as a name (e.g., "John Doe") and/or a business name (e.g., "John Doe Insurance Corporation") in the portion of the document 360, and is unlikely to search for other text such as "line", "blank", etc. As such, key-value pairs such as "Name: John Doe" and "Business name: John Doe Insurance Corporation" are extracted from the portion of the document 360.

FIG. 7 illustrates a portion of an example document 360 and keywords extracted from the portion, in accordance with an embodiment of the invention. If the document 360 comprises a tax return form as shown in FIG. 7, a user is most likely to search for text such as "Taxpayer Identification Number", "social security number", and/or "employee identification number", and is unlikely to search for other text such as "box", "line", etc. As such, keywords such as "Taxpayer Identification Number", "social security number", and "employee identification number" are extracted from the portion of the document 360.

Figure 8:
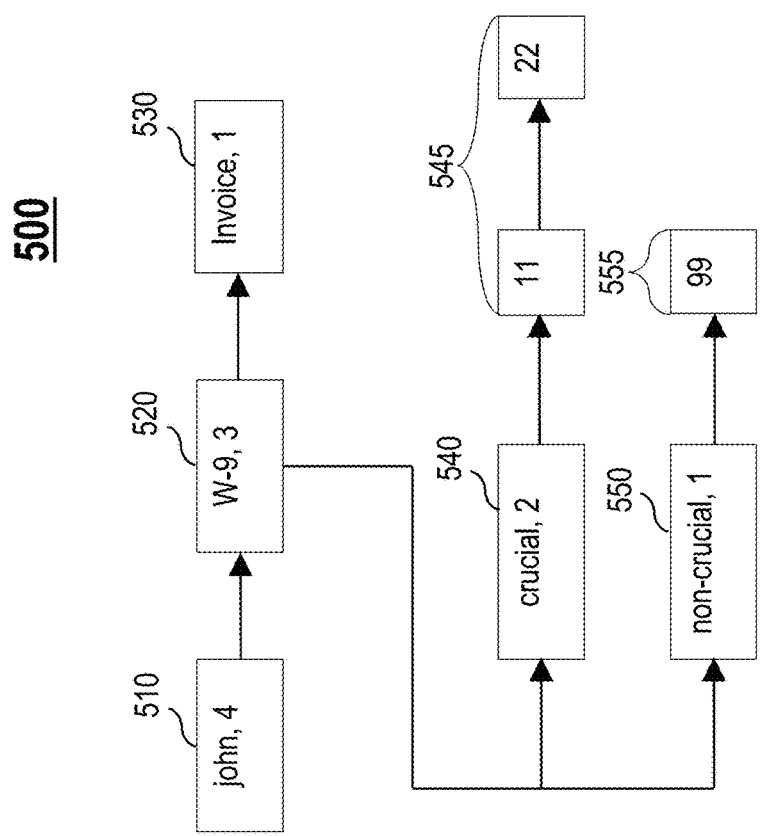
FIG. 8 illustrates an example posting list, in accordance with an embodiment of the invention.

FIG. 8 illustrates an example posting list 500, in accordance with an embodiment of the invention. Assume the posting list 500 corresponds to an indexing word "john" that is extracted from different documents of different document types (e.g., W-9, Invoice). The posting list 500 comprises an indexing word tier 510 identifying the indexing word "john" and the overall frequency of the word "john" (e.g., 4) across the different documents. The indexing word tier 510 references/points to multiple document type tiers, specifically a first document type tier 520 and a second document type tier 530.

The first document type tier 520 identifies a first document type "W-9" and the frequency of the word "john" (e.g., 3) across documents of the first document type "W-9". The second document type tier 530 identifies a second document type "Invoice" and the frequency of the word "john" (e.g., 1) across documents of the second document type "Invoice".

The first document type tier 520 has a corresponding crucial tier 540 and non-crucial tier 550. The crucial tier 540 identifies the frequency of the word "john" (e.g., 2) across documents that contain the word "john" as crucial information (i.e., in crucial portions of the documents), and references/points to a corresponding crucial list 545 identifying IDs of the documents (e.g., 11, 22). The non-crucial tier 550 identifies the frequency of the word "john" (e.g., 1) across documents that contain the word "john" as non-crucial information (i.e., in non-crucial portions of the documents), and references/points to a corresponding non-crucial list 555 identifying IDs of the documents (e.g., 99).

Figure 9:
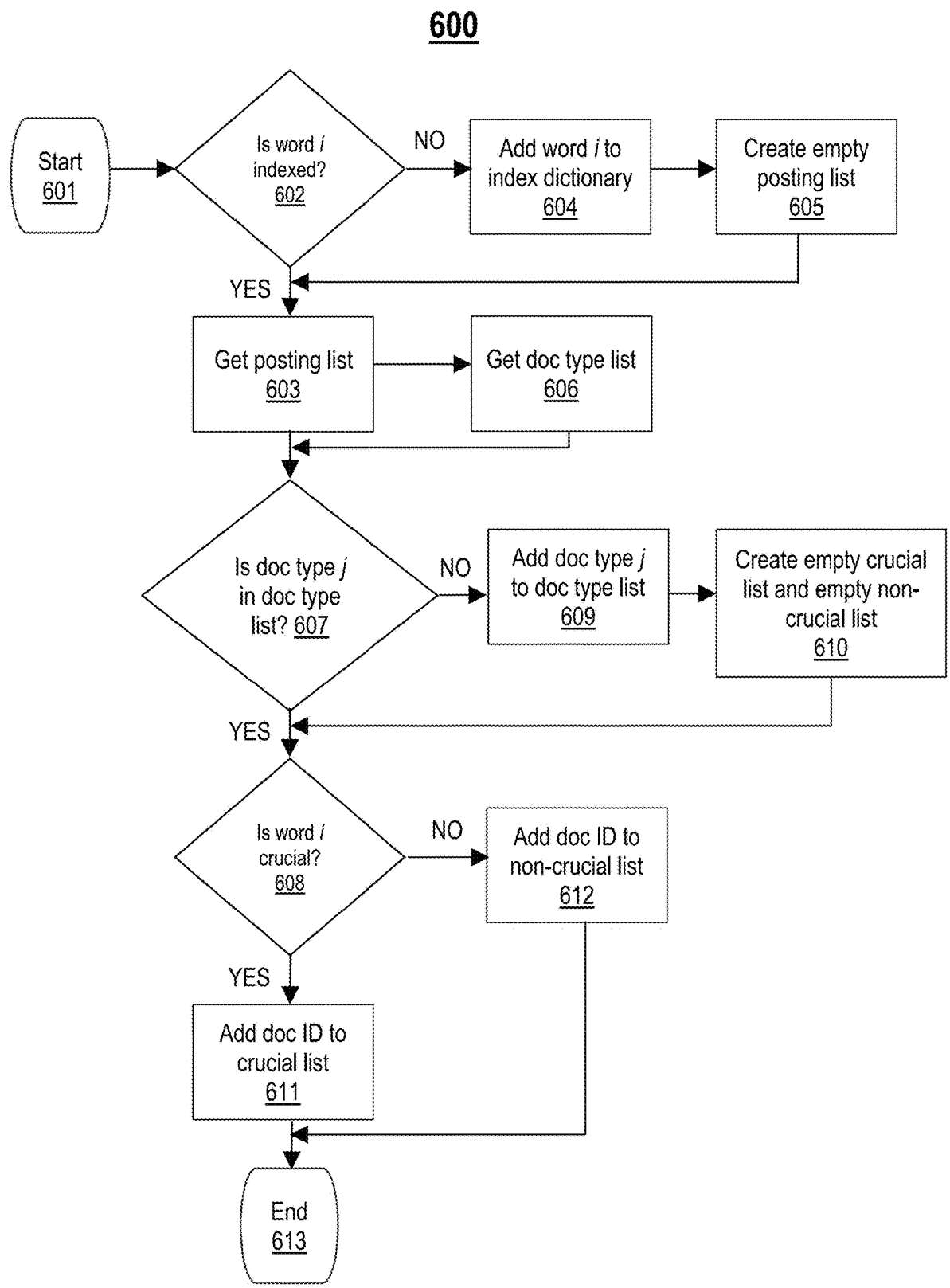
FIG. 9 illustrates a flowchart for an example process for creating a posting list, in accordance with an embodiment of the invention.

FIG. 9 illustrates a flowchart for an example process 600 for creating a posting list, in accordance with an embodiment of the invention. In process block 601, the process 600 starts. In process block 602, determine whether word i is indexed, where word i is a potential indexing word.

If word i is indexed, proceed to process block 603. In process block 603, get a posting list created for word i.

If word i is not indexed, proceed to process block 604. In process block 604, add word i to an index dictionary. In process block 605, create an empty posting list for word i, and proceed to process block 603.

In process block 606, get a document type list ("doc type list") for word i. In process block 607, determine whether document type ("doc type") j is in the doc type list.

If doc type j is in the doc type list, proceed to process block 608. In process block 608, determine whether word i is crucial information.

If doc type j is not in the doc type list, proceed to process block 609. In process block 609, add doc type j to the doc type list. In process block 610, create an empty crucial list and an empty non-crucial list, and proceed to process block 608.

If word i is crucial information, proceed to process block 611. In process block 611, add a document ID ("doc ID") of a document of doc type j that contains word i as crucial information to a crucial list.

If word i is non-crucial information, proceed to process block 612. In process block 612, add the doc ID of the document of doc type j that contains word i as non-crucial information to a non-crucial list, and proceed to process block 613.

In process block 613, the process 600 ends.

In some embodiments, process blocks 601-613 are performed by one or more components of the system 400, such as the indexer unit 460.

Figure 10:
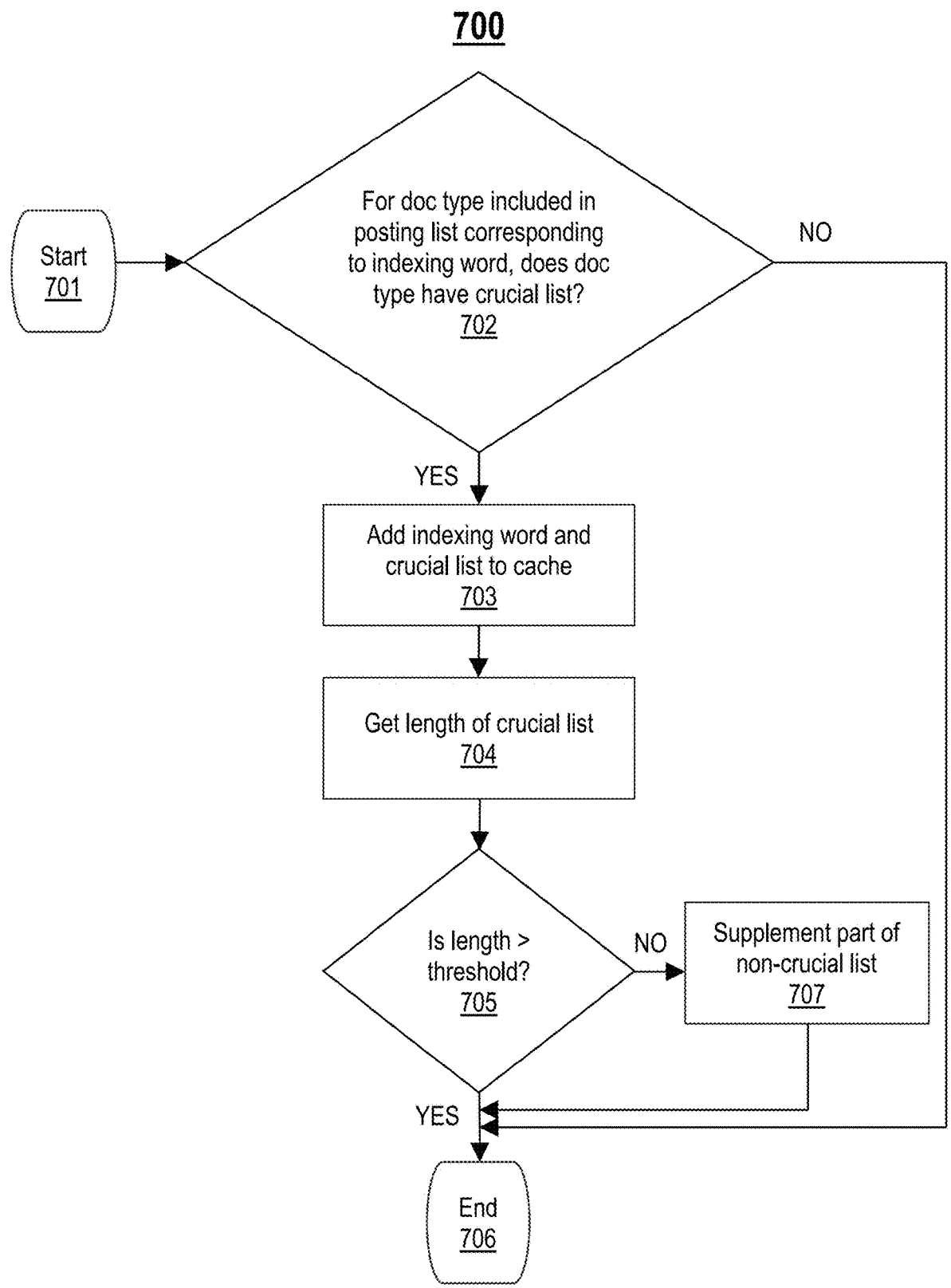
FIG. 10 illustrates a flowchart for an example process for caching an inverted index, in accordance with an embodiment of the invention.

FIG. 10 illustrates a flowchart for an example process 700 for caching an inverted index, in accordance with an embodiment of the invention. In one embodiment, process 700 is iterated for each document type included in each posting list that corresponds to each indexing word. In process block 701, the process 700 starts. In process block 702, for a document type ("doc type") included in a posting list corresponding to an indexing word, determine whether the doc type has a corresponding crucial list.

If the doc type has a corresponding crucial list, proceed to process block 703. In process block 703, add the indexing word and the corresponding crucial list to cache.

If the doc type does not have a corresponding crucial list, proceed to process block 706.

In process block 704, get a length of the corresponding crucial list. In process block 705, determine whether the length is greater than a pre-determined threshold.

If the length is greater than the pre-determined threshold, proceed to process block 706.

If the length is not greater than the pre-determined threshold, proceed to process block 707. In process block 707, supplement part of a non-crucial list that the doc type has to cache, and proceed to process block 706.

In process block 706, the process 700 ends.

In some embodiments, process blocks 701-706 are performed by one or more components of the system 400, such as the content index unit 470.

Figure 11:
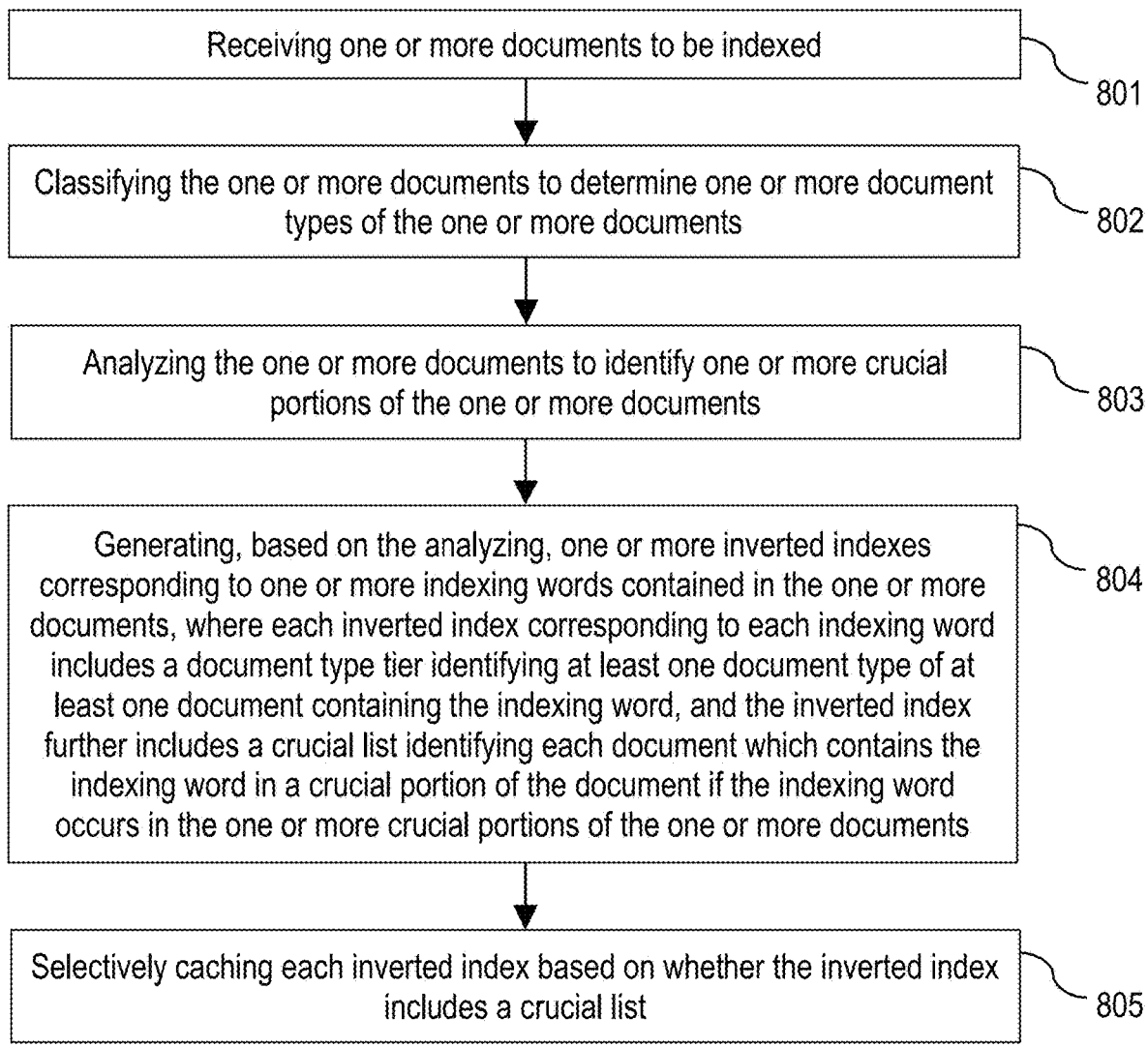
FIG. 11 is a flowchart for an example process for creating an inverted index, in accordance with an embodiment of the invention.

FIG. 11 is a flowchart for an example process 800 for creating an inverted index, in accordance with an embodiment of the invention. Process block 801 includes receiving one or more documents to be indexed. Process block 802 includes classifying the one or more documents to determine one or more document types of the one or more documents. Process block 803 includes analyzing the one or more documents to identify one or more crucial portions of the one or more documents. Process block 804 includes generating, based on the analyzing, one or more inverted indexes corresponding to one or more indexing words contained in the one or more documents, where each inverted index corresponding to each indexing word includes a document type tier identifying at least one document type of at least one document containing the indexing word, and the inverted index further includes a crucial list identifying each document which contains the indexing word in a crucial portion of the document if the indexing word occurs in the one or more crucial portions of the one or more documents. Process block 805 includes selectively caching each inverted index based on whether the inverted index includes a crucial list.

In some embodiments, process blocks 801-805 are performed by one or more components of the system 400.

From the above description, it can be seen that embodiments of the invention provide a system, computer program product, and method for implementing the embodiments of the invention. Embodiments of the invention further provide a computer-useable storage medium for implementing the embodiments of the invention. The computer-useable storage medium has a computer-readable program, wherein the program upon being processed on a computer causes the computer to implement the steps of embodiments of the invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. § 112 (f), unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for creating an inverted index, comprising:
receiving one or more documents to be indexed;
classifying the one or more documents to determine one or more document types of the one or more documents;
analyzing the one or more documents to identify one or more crucial portions of the one or more documents based on identifying therein a key-value pair, a table, or keyword;
generating, based on the analyzing, one or more inverted indexes corresponding to one or more indexing words contained in the one or more documents, wherein each inverted index corresponding to each indexing word includes a document type tier identifying at least one document type of at least one document containing the respective indexing word, and the inverted index further includes a crucial list identifying each document which contains the respective indexing word in a crucial portion of the respective document if the respective indexing word occurs in the one or more crucial portions of the one or more documents; and
selectively caching each inverted index based on whether the inverted index includes the crucial list.

2. The method of claim 1, further comprising:
for each inverted index, loading the inverted index into cache priorly only if the inverted index includes the crucial list.

3. The method of claim 2, further comprising:
for each inverted index loaded into the cache priorly:
determining a length of a crucial list included in the inverted index; and
adding a part of a non-crucial list included in the inverted index to cache if the length of the crucial list is not greater than a pre-determined threshold.

4. The method of claim 1, wherein, for each document type of a document type tier included in each inverted index, the inverted index further includes at least one of:
a crucial list identifying each document of the respective document type which contains the respective indexing word in a crucial portion of the respective document; and
a non-crucial list identifying each document of the respective document type which contains the respective indexing word in a non-crucial portion of the respective document.

5. The method of claim 1, further comprising:
for each document, maintaining a document type of the respective document and one or more crucial portions of the respective document in a database.

6. The method of claim 1, further comprising:
for each indexing word, creating a corresponding posting list identifying each document containing the respective indexing word and a frequency of the respective indexing word across the one or more documents;
wherein each inverted index corresponding to each indexing word is generated based on each posting list corresponding to the indexing word.

7. A system for creating an inverted index, comprising:
at least one processor; and
a processor-readable memory device storing instructions that when executed by the at least one processor causes the at least one processor to perform operations including:
receiving one or more documents to be indexed;
classifying the one or more documents to determine one or more document types of the one or more documents;
analyzing the one or more documents to identify one or more crucial portions of the one or more documents based on identifying therein a key-value pair, a table, or keyword;
generating, based on the analyzing, one or more inverted indexes corresponding to one or more indexing words contained in the one or more documents, wherein each inverted index corresponding to each indexing word includes a document type tier identifying at least one document type of at least one document containing the respective indexing word, and the inverted index further includes a crucial list identifying each document which contains the respective indexing word in a crucial portion of the respective document if the respective indexing word occurs in the one or more crucial portions of the one or more documents; and
selectively caching each inverted index based on whether the inverted index includes the crucial list.

8. The system of claim 7, wherein the operations further include:
for each inverted index, loading the inverted index into cache priorly only if the inverted index includes the crucial list.

9. The system of claim 8, wherein the operations further include:
for each inverted index loaded into the cache priorly:
determining a length of a crucial list included in the inverted index; and
adding a part of a non-crucial list included in the inverted index to cache if the length of the crucial list is not greater than a pre-determined threshold.

10. The system of claim 7, wherein, for each document type of a document type tier included in each inverted index, the inverted index further includes at least one of:
a crucial list identifying each document of the respective document type which contains the respective indexing word in a crucial portion of the respective document; and
a non-crucial list identifying each document of the respective document type which contains the respective indexing word in a non-crucial portion of the respective document.

11. The system of claim 7, wherein the operations further include:
for each document, maintaining a document type of the respective document and one or more crucial portions of the respective document in a database.

12. The system of claim 7, wherein the operations further include:
for each indexing word, creating a corresponding posting list identifying each document containing the respective indexing word and a frequency of the respective indexing word across the one or more documents;
wherein each inverted index corresponding to each indexing word is generated based on each posting list corresponding to the respective indexing word.

13. A computer program product for creating an inverted index, the computer program product comprising a computer readable storage medium having program instructions embodied therewith, the program instructions executable by a processor to cause the processor to:
receive one or more documents to be indexed;
classify the one or more documents to determine one or more document types of the one or more documents;

analyze the one or more documents to identify one or more crucial portions of the one or more documents based on identifying therein a key-value pair, a table, or keyword;

generate, based on the analyzing, one or more inverted indexes corresponding to one or more indexing words contained in the one or more documents, wherein each inverted index corresponding to each indexing word includes a document type tier identifying at least one document type of at least one document containing the respective indexing word, and the inverted index further includes a crucial list identifying each document which contains the respective indexing word in a crucial portion of the respective document if the respective indexing word occurs in the one or more crucial portions of the one or more documents; and selectively cache each inverted index based on whether the inverted index includes the crucial list.

14. The computer program product of claim 13, wherein the program instructions executable by the processor further cause the processor to:

for each inverted index, load the inverted index into cache priorly only if the inverted index includes the crucial list.

15. The computer program product of claim 14, wherein the program instructions executable by the processor further cause the processor to:

for each inverted index loaded into the cache priorly:
determine a length of a crucial list included in the inverted index; and
add a part of a non-crucial list included in the inverted index to cache if the length of the crucial list is not greater than a pre-determined threshold.

16. The computer program product of claim 13, wherein, for each document type of a document type tier included in each inverted index, the inverted index further includes at least one of:

a crucial list identifying each document of the respective document type which contains the respective indexing word in a crucial portion of the respective document; and a non-crucial list identifying each document of the respective document type which contains the respective indexing word in a non-crucial portion of the respective document.

17. The computer program product of claim 13, wherein the program instructions executable by the processor further cause the processor to:

for each document, maintain a document type of the respective document and one or more crucial portions of the respective document in a database.

\* \* \* \* \*